Sept. 11, 1956  B. BIDERMAN  2,762,562
RESOLVING APPARATUS
Filed July 10, 1952

INVENTOR.
BEN BIDERMAN
BY Marvin Moody
ATTORNEY

United States Patent Office 2,762,562
Patented Sept. 11, 1956

2,762,562

RESOLVING APPARATUS

Ben Biderman, Cedar Rapids, Iowa, assignor to Collins Radio Company, Cedar Rapids, Iowa, a corporation of Iowa Application July 10, 1952, Serial No. 298,156

4 Claims. (Cl. 235—61)

This invention relates in general to resolving means and in particular to means for increasing the accuracy of resolvers.

Computers which utilize resolvers are being used more and more. As for example, in the aircraft electronics field, resolvers are used in navigation computers. On an aircraft there is generally an alternating current voltage available. For example, 400 cycle generators are generally found on aircraft but the signals thus generated will vary from 360 to 440 cycles. Resolver nulls change in character when frequency changes. This is true because they are inductive and resistive devices of air gap construction.

It is an object of the present invention, therefore, to provide a resolver energizing means wherein the power supplied for driving the resolvers is obtained from the conventional A. C. power source carried on the aircraft but where the inaccuracies caused by frequency fluctuations are substantially eliminated due to the use of a secondary frequency standard carried on the aircraft and which provides little power but serves primarily as a frequency reference.

Another object of this invention is to eliminate the effects of frequency variations caused in the power supplies when connected to resolver systems.

Further features, objects and advantages of this invention will become apparent from the following description and claims when read in view of the drawings, in which:

For illustrative purposes the invention will be described with respect to a particular problem. It is to be realized that the invention is not limited to this particular illustration.

Figure 3:
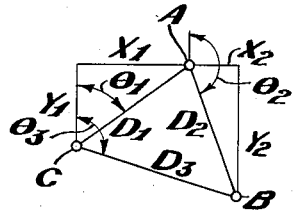
Figure 3 is a plot of the various signal components being solved in the example shown.

Figure 3 illustrates a radio station A which is located at the origin of a Cartesian plotting system. Way point B is the desired destination of aircraft C. Coordinates of the aircraft relative to the station are indicated by $x_1$ and $y_1$ whereas the coordinates of the way point B relative to the station A are indicated by $x_2$ and $y_2$. The distance from the way point to the station is designated as $D_2$, the distance from the aircraft to the station is designated as $D_1$, and the distance from the aircraft to the way point is designated as $D_3$. The bearing of the way point from the station is designated as $\theta_2$, the bearing of the station from the aircraft as $\theta_1$, and the bearing of the way point from the aircraft as $\theta_3$. The distance $D_2$ and bearing $\theta_2$ are known because they may be measured directly from a map.

It is assumed that the angle $\theta_1$ and the distance $D_1$ is known, perhaps from distance measuring equipment carried on the aircraft and a radio compass. It is desired to solve for the angle $\theta_3$ and the distance $D_3$ so that the pilot may know his bearing and distance to the way point. It is to be realized, of course, that such problems arise when the way point has no radio facilities available for use for the aircraft's conventional direction finding and distance measuring equipment.

Figure 1:
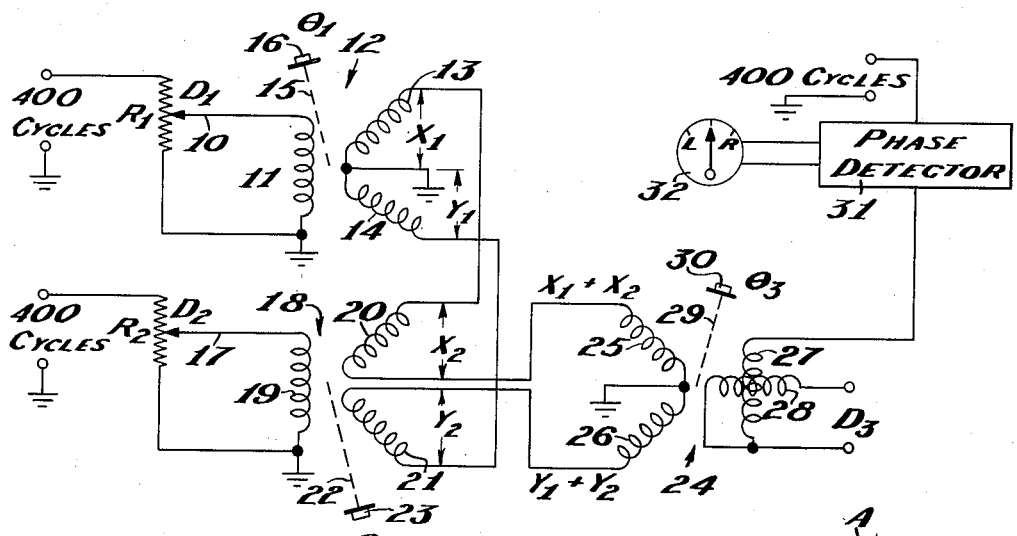
Figure 1 illustrates a conventional connection for resolving apparatus utilized to solve a way point problem.

Figure 1 illustrates the conventional manner in which the problem is solved. A first potentiometer $R_1$ is connected to a 400 cycle power source carried on the aircraft and a movable contact 10 of the potentiometer $R_1$ is adjusted to the known distance $D_1$, either manually or with a suitable servo system. The slide contact 10 is connected to one end of a winding 11 of a low impedance resolver, designated generally as 12. A pair of windings 13 and 14 are positioned at right angles to each other. A shaft 15 is connected to a knob 16 which is set to the angle $\theta_1$ either manually or by a suitable servo system. The shaft 15 turns the rotor of the resolver 12 to the angle $\theta_1$ and the coordinate $x_1$ will appear across the winding 13, whereas the coordinate $y_1$ will appear across the winding 14. Either the winding 11 or the windings 13 and 14 may be the rotor.

A second potentiometer $R_2$ receives a 400 cycle input from the power supply and has a slide contact 17 which is manually or automatically set to the known distance $D_2$. A resolver 18 is similar to the resolver 12 and has a first winding 19 connected to the slide contact 17. A second pair of windings 20 and 21 are mounted at right angles to each other and the rotor of the resolver 18 is connected to a shaft 22 which has a knob 23 that is set manually to the angle $\theta_2$. It is to be realized that either the winding 19 or the windings 20 and 21 may constitute the rotor. The winding 20 will have developed across it a signal proportional to $x_2$ whereas the winding 21 will have developed across it a signal proportional to $y_2$.

The outputs of the windings 13, 14, 20 and 21 are added together to obtain, respectively, $x_1+x_2$, and $y_1+y_2$. It is to be realized that the signs of the different signals may be positive or minus so as to give the coordinate of the way point $x_3$ and $y_3$.

A third resolver of high impedance 24 has a first pair of windings 25 and 26 mounted at right angles to each other and which are connected, respectively, to the $x$ and $y$ outputs of the resolvers 12 and 18. The windings 25 and 26 are connected together and to ground.

A second pair of windings 27 and 28 are at right angles to each other. The windings 25 and 26 may constitute either the rotor or the stator of the resolver. The rotor of the resolver is connected to a shaft 29 which has a knob 30 attached thereto. The winding 27 is connected to a phase detector 31 which also receives an input from the 400 cycle power supply of the aircraft. The output of the phase detector is supplied to a left-right meter 32. When the output of the winding 27 is zero, the meter 32 will indicate a center position and when this condition exists the output across the winding 28 will be proportional to the distance $D_3$. The position of the rotor will then be equal to $\theta_3$.

Thus the knob 30 is rotated until the meter 32 is centered. This apparatus is accurate if the power supply does not vary in frequency. When variations occur, however, quadrature voltages will be developed that will cause inaccuracies in the system.

Such inaccuracies in the system, caused by the usual voltage and frequency fluctuations in the primary power source of 400 cycles, are reflected in the indications of the directional instrument 32 and any distance indicating instrument which is connected to the terminals of winding 28. Inaccuracy in the direction instrument 32 is intolerable because a small directional error will result in substantial navigational error. Since accuracy of this instrument demands a constant frequency excitation of the resolvers and since the power requirements of this instrument are very low, a stable frequency, low power oscillator could suitably supply this direction instrument. However, the distance output of the resolver system requires a relatively large amount of power and the excitation of the resolvers requires appreciable power. For these requirements a low power oscillator is unsuitable. Since the errors introduced into the distance output by fluctuations in the primary power supply frequency are not of serious consequence this output is most suitably supplied from the 400 cycle source. Therefore, applicant has found that a far superior system is obtained by the use of two power sources for the resolver system, one of which is a low power, stable frequency source.

Figure 2:
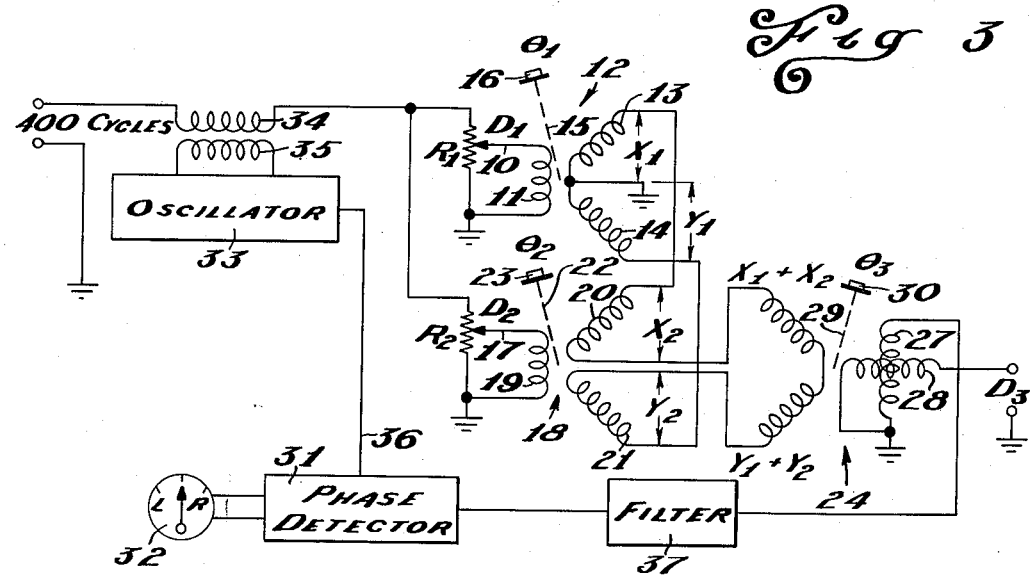
Figure 2 illustrates a system according to the principle of my invention, wherein the effects of frequency excursions in the power supply are substantially eliminated.

Applicant proposes to eliminate the inaccuracies in the resolver system with the structure shown in Figure 2. A stable oscillator 33 is connected to a first winding 35 of a transformer. The other winding 34 of the transformer is connected in series with the 400 cycle power supply so that the frequency of the oscillator will be superimposed on the 400 cycle signal. The output of the oscillator might be at a low power level and might be obtained from a crystal which is a very stable source. The resolvers 12, 18, and 24 are connected in the same manner as in Figure 1.

The output of the winding 27 from the resolver 24 will be fed to the phase detector 31 and an input from the oscillator 33 will be fed through the leads 36 to the phase detector 31.

A filter 37 is connected between winding 27 and phase detector 31 and filters out the 400 cycle signal. It is to be realized that the oscillator frequency is much higher or lower.

In operation, the system is excited with two distinct frequencies. The voltage of stable oscillator 33, preferably of relatively high frequency, is superimposed upon the primary source voltage of 400 cycles. Since all of the resolvers 12, 18 and 24 are energized at both frequencies, the output windings 27 and 28 of final resolver 24 will have voltages induced in them of both frequencies. The voltage induced in null winding 27 is applied to filter 37 which rejects the 400 cycle component of voltage and passes the high frequency component which is applied to phase detector 31. If the angle $\theta_3$ is set so that winding 27 is in the true null position, zero voltage of the high frequency from the oscillator will be induced in the winding and the indicator 32 will be in the central position. This is so even though a true null is not set with respect to the voltage from the 400 cycle source which may be of fluctuating frequency, because voltage of this frequency is not applied to the phase detector and indicator by reason of filter 37. If the angle $\theta_3$ is displaced from the true null position, a voltage of oscillator frequency will be induced which has a phase corresponding to the direction of displacement. This voltage is applied to the phase detector and compared with the reference phase from the oscillator and the output of the phase detector causes indicator movement corresponding to the direction and amount of displacement. The voltage induced in the other winding 28 of resolver 24 includes a frequency component from each of the sources. This voltage appearing at terminals $D_3$ may be applied to distance indicating instruments requiring appreciable power since it is energized with the 400 cycle component from the primary power source. Since the entire resolver system is energized from both sources, and the stable frequency voltage of relatively low value is superimposed upon the voltage from the primary source, the primary source of 400 cycles supplies the losses of the system.

The superposition of the oscillator 33 will greatly increase the stability and accuracy of the system. In other words, the oscillator output is impressed on the system and is used to greatly increase the accuracy. If the 400 cycle power supply varies it does not affect the accuracy of the circuit shown in Figure 2.

Although this invention has been described with respect to preferred embodiments thereof, it is not to be so limited as changes and modifications may be made therein which are within the full intended scope of the invention, as defined by the appended claims.

I claim:

1. Means for removing inaccuracies from a resolver-computer caused by fluctuations in the frequency of the power supply comprising, an input circuit connected to said power supply and to said resolver system, a stable oscillator oscillating at a frequency different from that of the power supply and coupled to said input circuit, a filter receiving the output of said resolver-computer to filter out the power supply frequency, and a phase detector receiving an input from said oscillator and an input from said filter, a pair of output terminals connected to said resolver system, and said output terminals being energized with a voltage having frequency components corresponding to the frequencies of the power supply and said stable oscillator and being adapted to deliver a relatively high-powered output.

2. Means for eliminating errors in resolver-computers caused by frequency drift of a power supply comprising, an oscillator impressing an input on the resolve-computers, a filter connected to the output of said resolver-computers and passing the output of said oscillator but not the frequency of the power supply, a phase detector receiving inputs from said oscillator and said filter, and a meter receiving the output of said phase detector, a pair of output terminals connected to said resolver system, and said output terminals being energized with a voltage having frequency components corresponding to the frequencies of the power supply and said oscillator and being adapted to deliver a relatively high-powered output.

3. In combination, a resolver comprising a first member provided with energizing windings, a second member provided with a pair of angularly displaced induced windings, said members being relatively rotatable whereby the inductive coupling between said windings may be varied, an energizing circuit connected across the terminals of said energizing winding and including first and second voltage sources, said first source being of relatively low frequency, high power and subject to frequency fluctuation, said second source being of relatively high frequency, low power and stable frequency, filter means connected across the terminals of the first of said induced winding for rejecting voltages of the frequency of said first source, null voltage detecting means responsive to voltages of the frequency of said second source connected across said filter, whereby the rotative position of said members for null voltage in said detecting means is independent of the frequency fluctuations of said first source, output terminals connected across the other of said induced windings, said output terminals being energized with a voltage having frequency components corresponding to the frequency of each of said sources and being adapted to deliver a relatively high output, whereby said null position is independent of the frequency of said first source.

4. A resolver system comprising, a resolver including a first member provided with energizing windings, a second member provided with a pair of angularly displaced induced windings, a first voltage source of relatively high power and low frequency subject to frequency fluctuation, a second voltage source of relatively low power and stable high frequency, means for impressing the voltage from each of said sources across the terminals of said energizing windings, said members being relatively rotatable to vary the inductive coupling between the induced and energizing windings, a filter connected across the terminals of one of said induced windings for rejecting voltages of the frequency of said first source, voltage detecting means including an indicator connected across said filter responsive to voltages of the frequency of said second source, means for rotating one of said members to a null position so that the said inductive coupling for voltages of the frequency of said second source is zero as indicated by said indicator, output terminals connected across the other of said induced windings, said output terminals being energized with a voltage having frequency components corresponding to the frequency of each of said sources and being adapted to deliver a relatively high power output, whereby said null position is independent of the frequency of said first source.

References Cited in the file of this patent

UNITED STATES PATENTS

| | | |
|---|---|---|
| 2,519,180 | Ergen | Aug. 15, 1950 |
| 2,532,158 | Ewing | Nov. 28, 1950 |
| 2,540,150 | Watts | Feb. 6, 1951 |
| 2,544,921 | Greenough | Mar. 13, 1951 |
| 2,548,278 | Wirkler | Apr. 10, 1951 |
| 2,569,328 | Omberg | Sept. 25, 1951 |
| 2,581,438 | Palmer | Jan. 8, 1952 |
| 2,599,889 | Biggs | June 19, 1952 |
| 2,639,410 | Harris | May 19, 1953 |
| 2,641,650 | Leypold et al. | June 9, 1953 |